US012805499B2

(12) United States Patent
Nakagawa

(10) Patent No.: US 12,805,499 B2
(45) Date of Patent: Nov. 24, 2026

(54) FISHING ROD

(71) Applicant: GLOBERIDE, INC., Higashikurume (JP)

(72) Inventor: Shintaro Nakagawa, Higashikurume (JP)

(73) Assignee: GLOBERIDE, INC., Tokyo (JP)

( * ) Notice: Subject to any disclaimer, the term of this patent is extended or adjusted under 35 U.S.C. 154(b) by 339 days.

(21) Appl. No.: 18/537,313

(22) Filed: Dec. 12, 2023

(65) Prior Publication Data

US 2024/0298622 A1 Sep. 12, 2024

(51) Int. Cl.
*A01K 87/08* (2006.01)

(52) U.S. Cl.
CPC .................................... *A01K 87/08* (2013.01)

(58) Field of Classification Search
CPC ................................ A01K 87/08; A01K 87/06
USPC ....................................................... 43/22, 20
See application file for complete search history.

(56) References Cited

U.S. PATENT DOCUMENTS

| | | | | |
|---|---|---|---|---|
| 2,431,972 A * | 12/1947 | Treadway | A01K 87/08 | 43/22 |
| 2,546,079 A * | 3/1951 | Seviola | A01K 97/01 | 43/18.1 CT |
| 3,073,055 A * | 1/1963 | Edwards | A01K 87/08 | 43/23 |
| 4,083,141 A * | 4/1978 | Shedd | A01K 87/02 | 43/22 |
| 4,403,439 A * | 9/1983 | Wallace | A01K 87/08 | 43/18.5 |
| 4,578,890 A * | 4/1986 | Childre | A01K 87/06 | 43/22 |
| 4,869,011 A * | 9/1989 | Whiting | A01K 87/08 | 43/23 |
| 5,033,224 A | 7/1991 | Wo-Hsi | | |
| 5,392,556 A * | 2/1995 | Ozeki | A01K 87/06 | 43/22 |
| 5,535,539 A * | 7/1996 | Vetre | A01K 87/08 | 43/18.1 R |

(Continued)

FOREIGN PATENT DOCUMENTS

| | | |
|---|---|---|
| CN | 113994938 A | 2/2022 |
| JP | 2000-125710 A | 5/2000 |

(Continued)

OTHER PUBLICATIONS

Jun. 6, 2024 Combined Search and Examination Report issued in United Kingdom Patent Application No. GB2319547.2.

(Continued)

*Primary Examiner* — Christopher P Ellis
(74) *Attorney, Agent, or Firm* — OLIFF PLC

(57) ABSTRACT

Included are a rod, a pair of fixed and floating hoods into which reel legs of a reel are inserted, a reel seat through which the rod is inserted; and a cylindrical body that is attached to an end (front end) of the reel seat and serves as a grip, in which the cylindrical body is attached to an outer peripheral surface of the end of the reel seat. The cylindrical body preferably comprises a main body portion attached to the outer peripheral surface of the end of the reel seat, and a hollow extension portion continuous with the main body portion and reducing in diameter in a direction away from the reel seat.

4 Claims, 6 Drawing Sheets

(56) References Cited

U.S. PATENT DOCUMENTS

| | | | | | |
|---|---|---|---|---|---|
| 5,600,915 | A * | 2/1997 | Ohmura | A01K 87/06 | 43/22 |
| 7,210,264 | B1 * | 5/2007 | Demetris | A01K 97/24 | 43/25 |
| 11,612,153 | B2 * | 3/2023 | Ito | A01K 87/06 | 43/22 |
| 11,950,584 | B1 * | 4/2024 | Hill | A01K 97/08 | |
| 12,161,100 | B2 * | 12/2024 | Osoreda | A01K 87/08 | |
| 2003/0145509 | A1 * | 8/2003 | Ito | A01K 87/06 | 43/22 |
| 2007/0068202 | A1 * | 3/2007 | Kolton | G08B 13/2482 | 70/57.1 |
| 2011/0113673 | A1 * | 5/2011 | Huang | A01K 87/08 | 43/23 |
| 2017/0112113 | A1 * | 4/2017 | Huang | A01K 87/08 | |
| 2018/0146651 | A1 * | 5/2018 | Leiberg | A01K 87/085 | |
| 2019/0166815 | A1 * | 6/2019 | Malcarne | A01K 87/06 | |
| 2020/0037590 | A1 | 2/2020 | Taniguchi et al. | | |
| 2021/0022329 | A1 * | 1/2021 | Shedd | A01K 87/02 | |
| 2021/0144983 | A1 * | 5/2021 | Osoreda | A01K 89/01925 | |
| 2021/0153486 | A1 * | 5/2021 | Ito | A01K 87/06 | |
| 2022/0030842 | A1 | 2/2022 | Akiba | | |
| 2024/0147977 | A1 * | 5/2024 | Omura | A01K 87/08 | |

FOREIGN PATENT DOCUMENTS

| | | | | |
|---|---|---|---|---|
| JP | 2004-201570 | A | | 7/2004 |
| JP | 2005-198588 | A | | 7/2005 |
| JP | 2016-077178 | A | | 5/2016 |
| JP | 2017-209020 | A | | 11/2017 |
| JP | 2018068227 | A | * | 5/2018 |
| JP | 2020-054272 | A | | 4/2020 |
| JP | 2020-089310 | A | | 6/2020 |
| JP | 2021141903 | A | | 9/2021 |
| JP | 2022-002542 | A | | 1/2022 |
| JP | 2022-100614 | A | | 7/2022 |
| WO | 2012/070259 | A1 | | 5/2012 |

OTHER PUBLICATIONS

Nov. 27, 2024 Examination Report issued in Australian Patent Application No. 2023282190.

Nov. 14, 2024 Examination Report issued in British Patent Application No. 2319547.2.

Dec. 16, 2025 Office Action issued in Chinese Patent Application No. 202410199915.3.

Jan. 27, 2026 Office Action issued in Japanese Patent Application No. 2023-035430.

Mar. 20, 2026 Office issued in Singaporean Patent Application No. 10202400011U.

* cited by examiner

FISHING ROD

CROSS-REFERENCE TO RELATED APPLICATION

This application claims priority under 35 U.S.C. § 119 to Japanese Patent Application No. 2023-035430 filed on Mar. 8, 2023 in the Japanese Patent Office, the entire contents of each hereby incorporated by reference.

BACKGROUND OF THE INVENTION

1. Technical Field

The present invention relates to a fishing rod.

2. Description of the Related Art

There is known a structure in which a reel seat is attached to a rod and grips are attached to front and rear of the reel seat (for example, JP 2004-201570 A). Each of the grips is formed of EVA, urethane, cork, or the like and externally fitted to the rod so that gripping comfort is improved. Furthermore, the grip is generally fixed to an outer peripheral surface of the rod with an adhesive.

SUMMARY OF THE INVENTION

In a case where the grip is fixed to the rod, the mass tends to increase because the grip is made thick until the diameter becomes substantially the same as an outer diameter of the reel seat. In order to reduce the weight, a material such as cork can be used, but there is a problem that workability is poor, and it is difficult to widen the range of designs. Furthermore, in a case where the rod is relatively thin, when an attempt is made to increase an area of adhesion with the grip, an adhesion surface has to be extended in an axial length direction, and there is a problem that the degree of freedom in design is low.

The present invention has been made to solve the above problems, and an object of the present invention is to provide a fishing rod capable of improving the degree of freedom in design and reducing the weight.

The present invention comprises: a rod: a pair of fixed and floating hoods into which reel legs of a reel are inserted; a reel seat through which the rod is inserted; and a cylindrical body that is attached to an end of the reel seat and serves as a grip, in which the cylindrical body is attached to an outer peripheral surface of the end of the reel seat.

According to the present invention, the cylindrical body can be used as a grip. Since the cylindrical body has a cylindrical shape and has a hollow inside, weight reduction can be achieved. Furthermore, since the cylindrical body is attached to the end of the reel seat having a diameter larger than that of the rod, a contact area with the cylindrical body can be increased as compared with the case where the cylindrical body is attached to the rod. As a result, the restriction at the time of attachment is reduced, and the degree of freedom in design can be increased.

It is preferable that the cylindrical body comprises a main body portion attached to the outer peripheral surface of the end of the reel seat, and a hollow extension portion continuous with the main body portion and reducing in diameter in a direction away from the reel seat.

According to the present invention, since the extension portion of the cylindrical body is reduced in diameter, the gripping property can be enhanced.

Furthermore, preferably, the cylindrical body is formed of metal.

According to the present invention, the strength of the cylindrical body can be enhanced, and the formability is higher than that of EVA, urethane, cork, and the like, so that a step or a gap between members can be reduced or eliminated.

Furthermore, preferably, the main body portion is bonded to an outer periphery of one of the hoods.

According to the present invention, an axial length can be shortened, and downsizing can be achieved. Furthermore, the cylindrical body can be easily fixed to the end of the reel seat by adhesion.

Furthermore, the extension portion is preferably separated from the rod.

According to the present invention, it is possible to prevent the cylindrical body from being damaged by the bending of the rod.

Furthermore, preferably, the reel seat comprises a central portion and the end at an edge of the central portion, the end of the reel seat is smaller in diameter than the central portion to form a step surface, and an outer peripheral surface of the main body portion of the cylindrical body and an outer peripheral surface of the central portion of the reel seat are flush with each other by attaching the cylindrical body to the step surface.

According to the present invention, the gripping property can be further enhanced.

Furthermore, it is preferable that an opening opened to a side is formed in the extension portion.

According to the present invention, the gripping property can be further enhanced, and the design property can be enhanced.

According to the fishing rod of the present invention, it is possible to improve the degree of freedom in design, improve the gripping property, and reduce the weight.

DETAILED DESCRIPTION

First Embodiment

Hereinafter, a first embodiment of a fishing rod of the present invention will be described with reference to the accompanying drawings. Note that in the description of the drawings, the same element is denoted by the same reference sign, and a duplicate description is appropriately omitted. In the following description, "front and rear" and "up and down" follow arrows in FIGS. 1, 2, and 5.

The direction is used for convenience of description, and does not limit the direction of the present invention.

Figure 1:
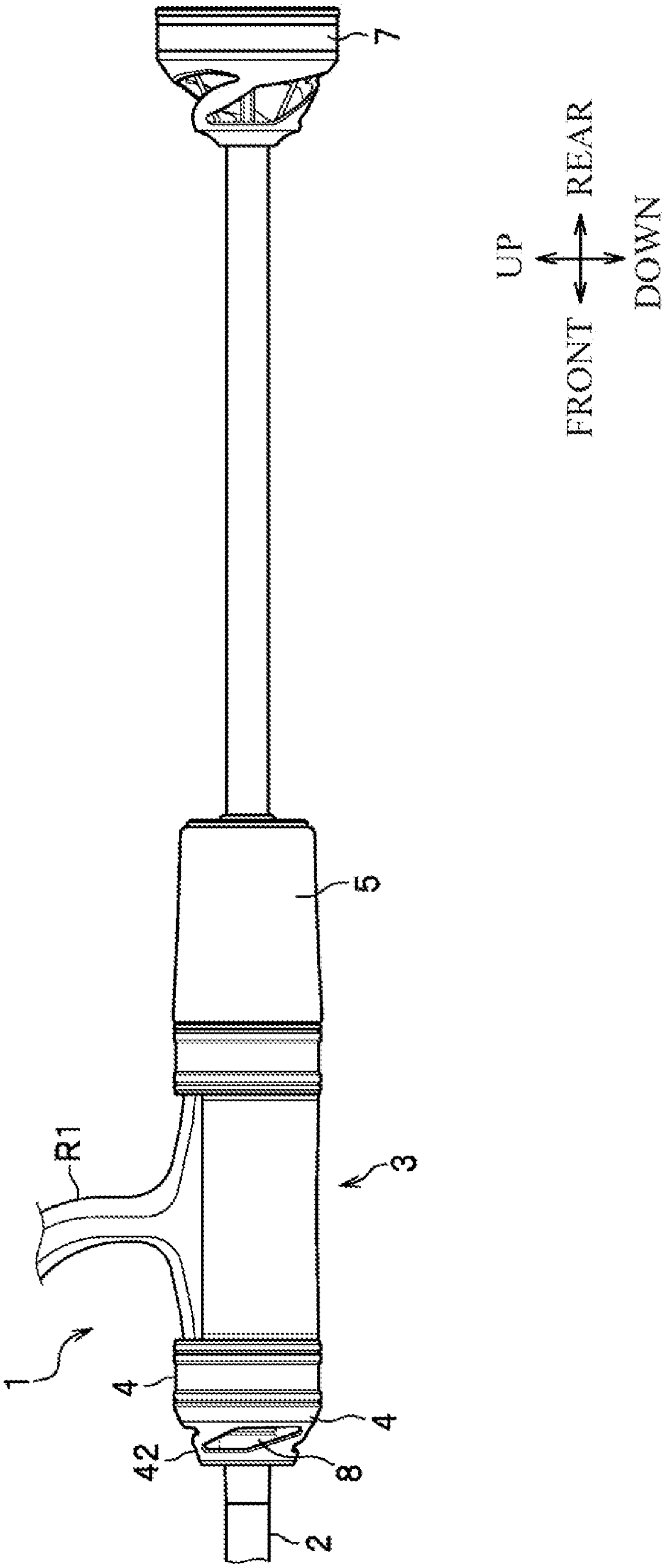
FIG. 1 is a side view illustrating a fishing rod according to a first embodiment of the present invention.

As illustrated in FIG. 1, a fishing rod 1 comprises a rod 2, a reel seat 3, a cylindrical body 4, a rear grip 5, and an end grip 7. The fishing rod 1 is configured by inserting the rod 2 through the cylindrical body 4, the reel seat 3, the rear grip 5, and the end grip 7 in this order from a rod tip side.

The rod 2 is a cylindrical member made of resin or wood as a main body of the fishing rod 1. The rod 2 may be constituted by one rod or a joining structure constituted by a plurality of rods.

Figure 5:
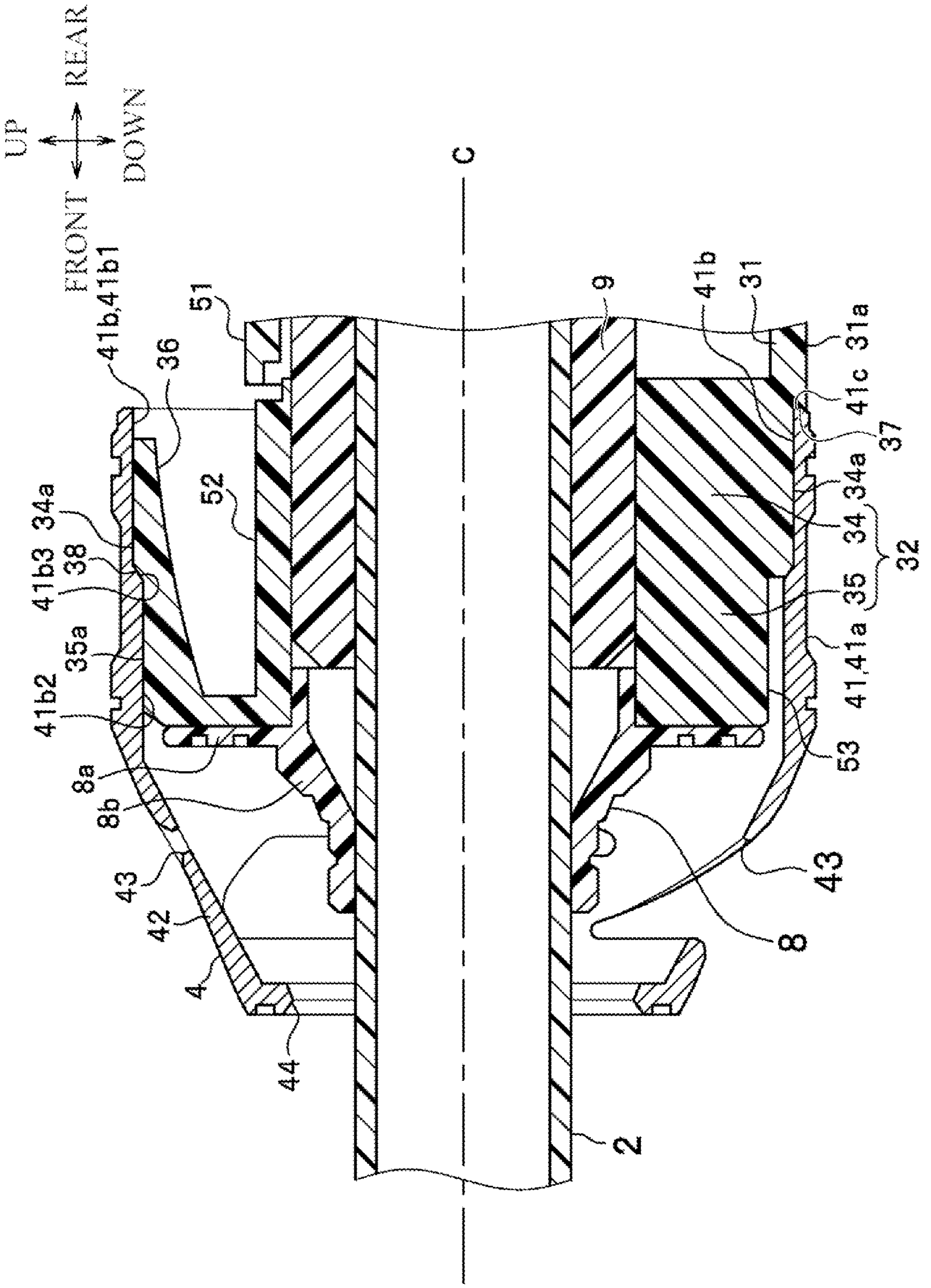
FIG. 5 is a cross-sectional view illustrating an attachment structure of the cylindrical body and the reel seat.

The reel seat 3 is a cylindrical member to which a reel leg R1 of a fishing reel is detachably fixed. A material of the reel seat 3 is not particularly limited, but in the present embodiment, the reel seat 3 is formed of resin in consideration of weight reduction. The rod 2 is inserted into a hollow portion inside the reel seat 3. As illustrated in FIG. 5, the reel seat 3 is fixed to the rod 2 by adhesion with a spacer 9 interposed therebetween.

Figure 2:
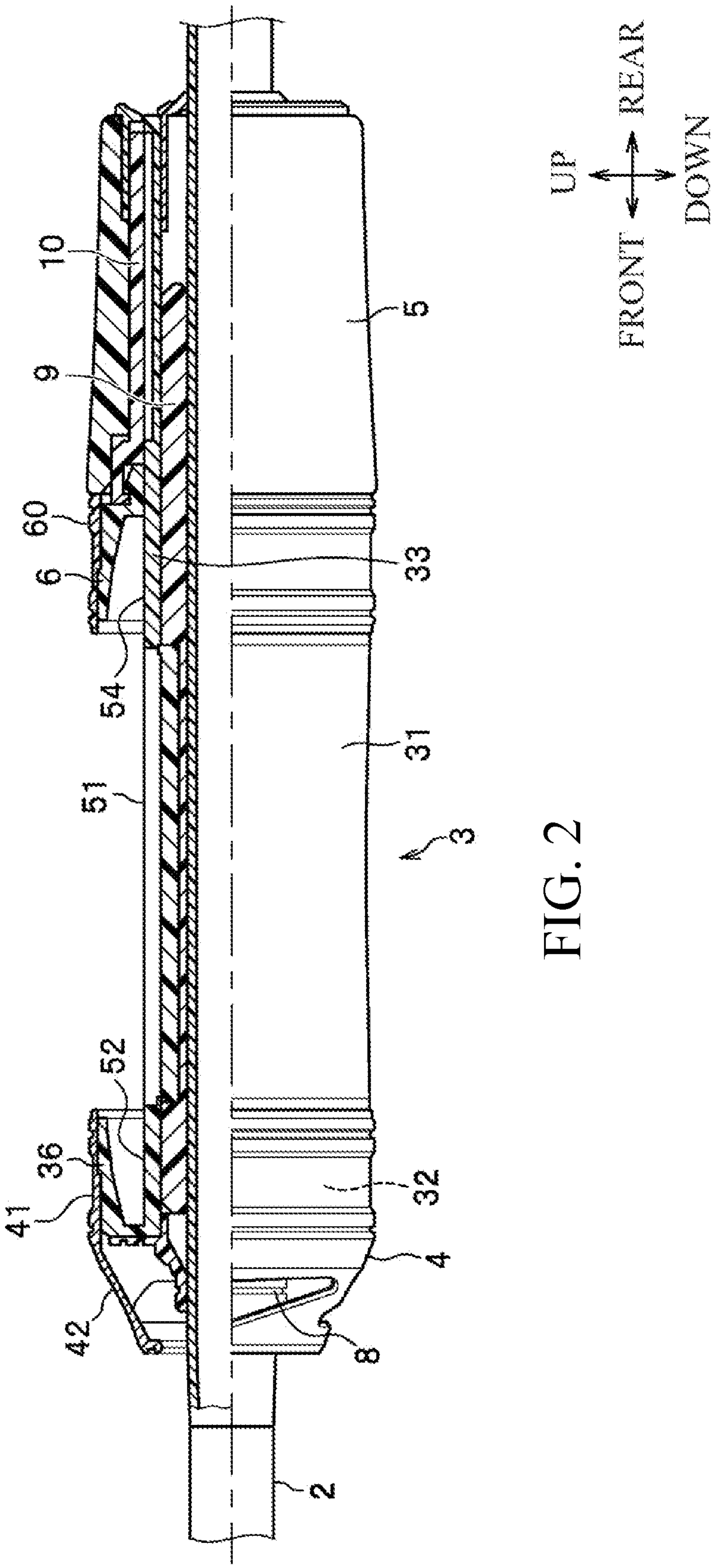
FIG. 2 is a partial cross-sectional view of a reel seat illustrated in FIG. 1.
Figure 3:
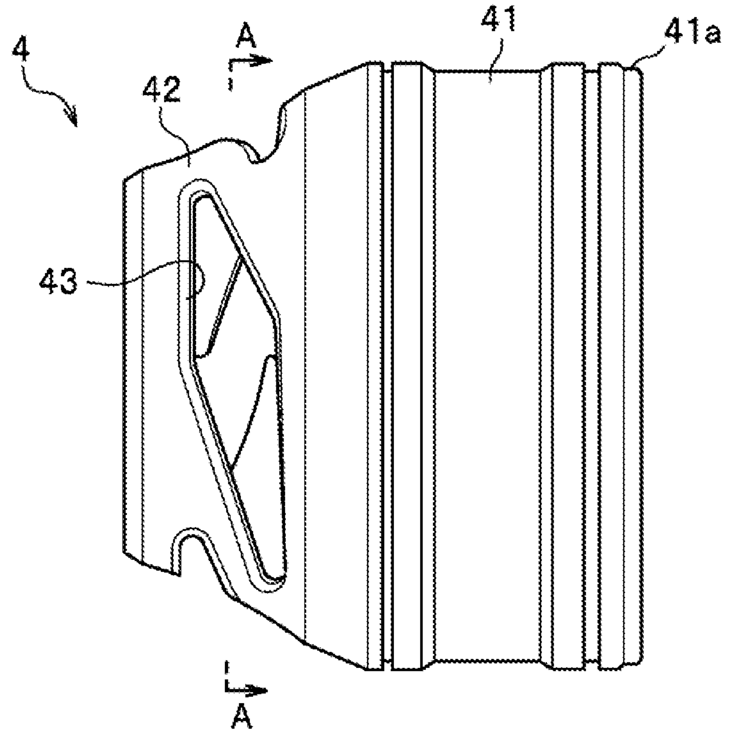
FIG. 3 is a side view illustrating a cylindrical body according to the embodiment.

As illustrated in FIG. 2, the reel seat 3 comprises a central portion 31, a front end (end) 32, and a rear end (end) 33. The central portion 31 is a portion constituting a center of the reel seat 3 in an axial direction, and has a hollow inside. A flat placement surface 51 is formed on an upper surface of the central portion 31. The placement surface 51 is a portion on which a central portion of the reel leg R1 is placed.

The front end 32 is a portion constituting a front end of the reel seat 3. As illustrated in FIG. 5, the front end 32 has a substantially cylindrical shape and is solid. The front end 32 comprises a large diameter portion 34 and a small diameter portion 35. The large diameter portion 34 is a portion continuing to the central portion 31. An outer diameter of an outer peripheral surface 34*a* of the large diameter portion 34 is slightly smaller than an outer diameter of an outer peripheral surface 31*a* of the central portion 31.

Between the outer peripheral surface 34*a* and the outer peripheral surface 31*a*, a step surface 37 perpendicular to each other is formed.

The small diameter portion 35 is a portion continuing to a front side of the large diameter portion 34. An outer peripheral surface 35*a* of the small diameter portion 35 is slightly smaller than the outer peripheral surface 34*a* of the large diameter portion 34 (See upper part in FIG. 5). An inclined step surface 38 is formed between the large diameter portion 34 and the small diameter portion 35. A molding groove 53 formed at the time of molding and extending in the axial direction is formed in a lower portion of the small diameter portion 35.

A fixed hood 36 cut out from the large diameter portion 34 to the small diameter portion 35 is formed in an upper portion of the front end 32. The fixed hood 36 is a hole opened rearward, and is a portion into which a front end of the reel leg R1 is inserted. The fixed hood 36 is provided with a flat placement surface 52. The placement surface 52 is formed at substantially the same height position as the placement surface 51 of the central portion 31. The placement surface 52 is a portion on which the front end of the reel leg R1 is placed.

As illustrated in FIGS. 1 and 2, the rear end 33 is a portion constituting a rear end of the reel seat 3. The rear end 33 has a substantially cylindrical shape and is hollow. A male screw is formed on an outer peripheral surface of a rear portion of the rear end 33, and is screwed with an operation cylinder 10 having a female screw. A front end of the operation cylinder 10 is rotatably engaged with a floating hood 6. Furthermore, the rear grip 5 is provided on an outer peripheral surface of the operation cylinder 10 over a circumferential direction and the axial direction. The rear grip 5 is formed of, for example, a flexible member such as natural cork, artificial cork, or ethylene vinyl acetate copolymer (EVA) of a foamable resin.

The floating hood 6 is a cylindrical member that is inserted into the rear end 33 and has a hole opened forward at an upper portion. The floating hood 6 is formed to be movable in a front-rear direction with respect to the rear end 33. A flat placement surface 54 is provided at a portion of the rear end 33 corresponding to the floating hood 6. The placement surface 54 is formed at substantially the same height position as the placement surface 51 of the central portion 31. The placement surface 54 is a portion on which a rear end of the reel leg R1 is placed. A ring member 60 is attached to an outer peripheral surface of the floating hood 6. The ring member 60 is provided with unevenness or the like for decoration or enhancing the gripping property. The ring member 60 may be omitted.

When the rear grip 5 is rotated forward and backward about an axis C, the operation cylinder 10 moves in the front-rear direction by the screwing of the operation cylinder 10. Accordingly, the floating hood 6 also moves in the front-rear direction, so that the reel leg R1 can be fixed or released.

Figure 4:
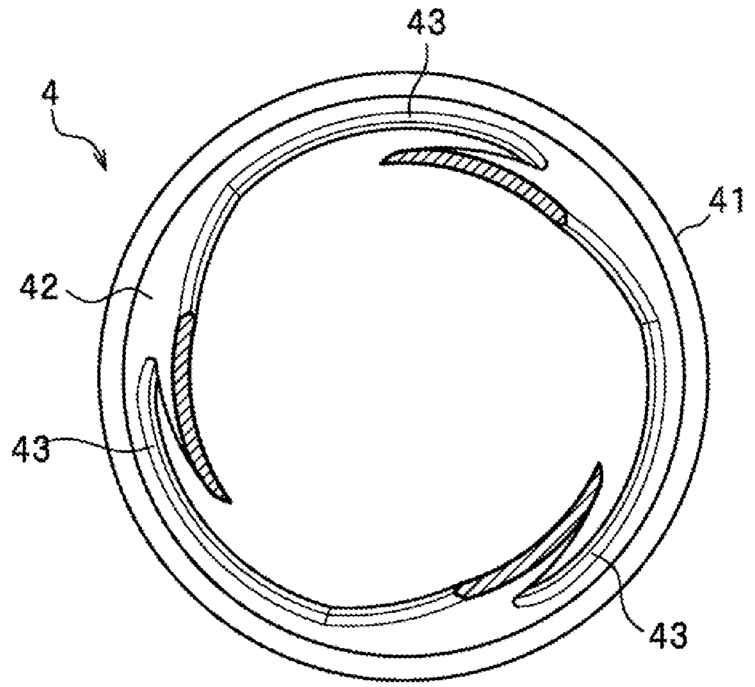
FIG. 4 is a cross-sectional view taken along line A-A of FIG. 3.

As illustrated in FIGS. 4 and 5, the cylindrical body 4 comprises a main body portion 41 and an extension portion 42.

A material of the cylindrical body 4 is not particularly limited, but is formed of, for example, metal, resin (also including a fiber-reinforced resin such as a carbon fiber resin and a glass fiber resin), or the like. The cylindrical body 4 has a grip function to be gripped by a user. The main body portion 41 has a cylindrical shape and is hollow. An outer peripheral surface 41*a* of the main body portion 41 is provided with unevenness or the like for decoration or enhancement of the gripping property. The outer peripheral surface 41*a* may be a flat surface.

A large diameter inner peripheral surface 41*b*1, a small diameter inner peripheral surface 41*b*2, and an inclined inner peripheral surface 41*b*3 are formed on an inner peripheral surface 41*b* of the main body portion 41. The large diameter inner peripheral surface 41*b*1 is slightly larger in diameter than the small diameter inner peripheral surface 41*b*2. The inclined inner peripheral surface 41*b*3 is a surface inclined between the large diameter inner peripheral surface 41*b*1 and the small diameter inner peripheral surface 41*b*2. The large diameter inner peripheral surface 41*b*1 is in surface contact with the outer peripheral surface 34*a* of the large diameter portion 34. The small diameter inner peripheral surface 41*b*2 is in surface contact with the outer peripheral surface 35*a* of the small diameter portion 35. The inclined inner peripheral surface 41*b*3 is in surface contact with the step surface 38.

As described above, the front end 32 is fitted in the main body portion 41. An end surface 41*c* of the main body portion 41 is in contact with the step surface 37. The front end 32 and the main body portion 41 may be attached by fitting, press-fitting, screwing, or the like, but are fixed by adhesion using an adhesive in the present embodiment.

The extension portion 42 is continuous with a front end of the main body portion 41 and extends in a direction away from the reel seat 3. A diameter of the extension portion 42 is reduced so as to approach the rod 2 as being separated from the reel seat 3. The rod 2 is inserted into an insertion hole 44 formed at a front end of the extension portion 42. The rod 2 is configured not to contact the extension portion 42. That is, an inner diameter of the insertion hole 44 is larger than an outer diameter of the rod 2. The extension portion 42 has a plurality of openings 43 opened to a side. The shape and number of the openings 43 may be appropriately set.

A decorative ring 8 made of resin or metal is provided inside the extension portion 42. The decorative ring 8 comprises a flange portion 8*a* and a rising portion 8*b*. The flange portion 8*a* has a plate shape and a ring shape. The flange portion 8*a* is bonded to an end surface of the front end 32 with an adhesive. The rising portion 8*b* is a portion rising forward from the flange portion 8*a*. A diameter of the rising portion 8*b* decreases so as to approach the front side. The rising portion 8*b* may be in contact with the rod 2 as in the present embodiment or may be separated from the rod 2.

According to the present embodiment described above, the cylindrical body 4 can be used as a grip.

Since the cylindrical body 4 has a cylindrical shape and has a hollow inside, weight reduction can be achieved. Furthermore, since the diameter of the extension portion 42 of the cylindrical body 4 is reduced, the gripping property can be enhanced.

Here, conventionally, in a case where the outer diameter of the rod is relatively small as in the present embodiment (for example, about 3 to 10 mm), it is necessary to secure the contact area by increasing the contact length in the direction of the axis C in order to attach a grip or the like, and the degree of freedom in design is limited.

In this regard, in the present embodiment, since the cylindrical body 4 is attached to the front end 32 of the reel seat 3 having a diameter larger than that of the rod 2, the contact area with the cylindrical body 4 can be increased as compared with the case where the cylindrical body 4 is attached to the rod 2. In other words, since the outer diameter of the front end 32 is large, the contact length in the direction of the axis C can be shortened. As a result, the restriction at the time of attachment is reduced, and the degree of freedom in design can be increased.

Furthermore, according to the present embodiment, the strength of the cylindrical body 4 can be increased, and the formability is higher than that of EVA, urethane, cork, and the like, so that a step or a gap between members can be reduced or eliminated. More specifically, it is possible to reduce or eliminate a gap or a step between the outer peripheral surface 41*a* of the cylindrical body 4 and the outer peripheral surface 31*a* of the central portion 31.

Furthermore, according to the present embodiment, the main body portion 41 is bonded to the outer periphery of the fixed hood 36.

As a result, the axial length can be shortened, and downsizing can be achieved. Furthermore, the cylindrical body 4 can be easily fixed to the front end 32 of the reel seat 3 by adhesion. Furthermore, according to the present embodiment, the extension portion 42 is separated from the rod 2. As a result, it is possible to prevent the cylindrical body 4 from being damaged by the bending of the rod 2.

Furthermore, according to the present embodiment, the outer peripheral surface 41*a* of the main body portion 41 of the cylindrical body 4 and the outer peripheral surface 31*a* of the central portion 31 of the reel seat 3 are flush or substantially flush with each other. Accordingly, it is possible to further improve the gripping property of the user.

Furthermore, according to the present embodiment, the openings 43 opened to the side are formed in the extension portion 42. As a result, the gripping property can be further enhanced, and the design property can be enhanced. Furthermore, since the inside can be seen by the openings 43, a three-dimensional design can be provided by providing the decorative ring 8. Furthermore, since the decorative ring 8 is in contact with the rod 2 and closes the front end of the front end 32, it is possible to prevent water or foreign matter from being mixed into the reel seat 3.

Furthermore, since the large diameter inner peripheral surface 41*b*1 and the inclined inner peripheral surface 4163 are provided on the inner peripheral surface of the cylindrical body 4, the cylindrical body 4 can be easily inserted into the front end 32. Furthermore, after the insertion, the outer peripheral surface of the front end 32 and the inner peripheral surface of the cylindrical body 4 are brought into surface contact with each other in the direction of the axis C, so that the attachment strength can be increased.

Second Embodiment

Figure 6:
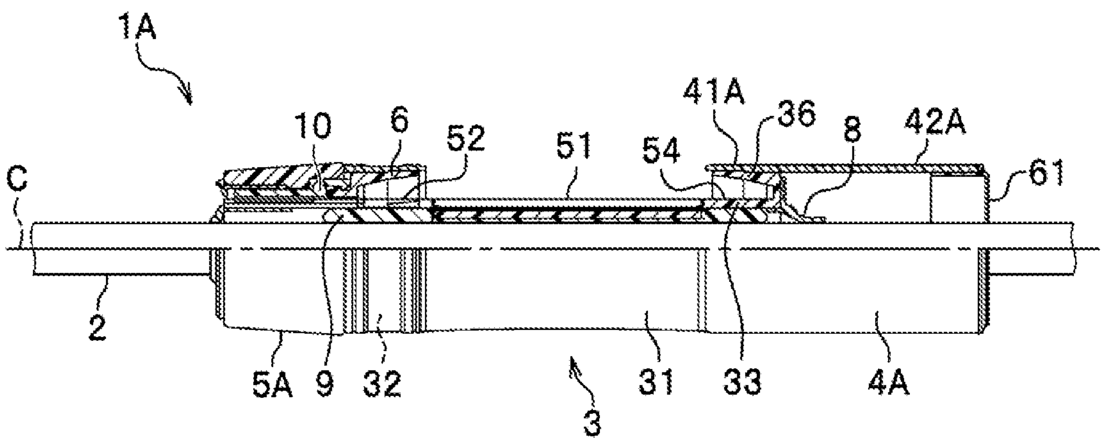
FIG. 6 is a side view illustrating a fishing rod according to a second embodiment of the present invention.

Next, a fishing rod according to a second embodiment of the present invention will be described. As illustrated in FIG. 6, the second embodiment is different from the first embodiment in that a floating hood 6 is provided at a front end 32 and a fixed hood 36 is formed at an upper portion of a rear end 33. That is, while the first embodiment is an up-lock type, the second embodiment is a down-lock type (the same applies to a third embodiment and a fourth embodiment). Furthermore, a cylindrical body 4A is different from that of the first embodiment in that an outer diameter of an extension portion 42A is constant. In a fishing rod 1A according to the second embodiment, differences from the first embodiment will be mainly described.

As illustrated in FIG. 6, the fishing rod 1A comprises a rod 2, a reel seat 3, the cylindrical body 4A, and a front grip 5A. The cylindrical body 4A is a portion serving as a grip, and comprises a main body portion 41A having a cylindrical shape and being hollow, and the extension portion 42A. An outer diameter of the main body portion 41A is constant over the axial direction. The cylindrical body 4A is attached to the rear end 33 of the reel seat 3 by fitting the rear end 33 inside the cylindrical body 4A. In other words, the main body portion 41A is attached to the outside of the fixed hood 36.

The extension portion 42A extends rearward continuously from the main body portion 41A. The extension portion 42A has a cylindrical shape and has a constant outer diameter. The extension portion 42A itself is not in contact with the rod 2. At a rear end of the extension portion 42A, a lid member 61 that covers the rear end is provided. The lid member 61 may be omitted.

A male screw is formed on an outer peripheral surface of a front portion of the front end 32, and is screwed with an operation cylinder 10 having a female screw. A rear end of the operation cylinder 10 is rotatably engaged with the floating hood 6. Furthermore, the front grip 5A is provided on the outer peripheral surface of the operation cylinder 10 over the circumferential direction and the axial direction. The front grip 5A is formed of, for example, a flexible member such as natural cork, artificial cork, or ethylene vinyl acetate copolymer (EVA) of a foamable resin.

The fishing rod 1A described above can also achieve substantially the same effects as those of the first embodiment.

That is, the cylindrical body 4A may be attached to the rear end of the reel seat 3. Furthermore, since the cylindrical body 4A is attached to the rear end 33 of the reel seat 3 having a diameter larger than that of the rod 2, the contact area with the cylindrical body 4A can be increased as compared with the case where the cylindrical body 4A is attached to the rod 2. In other words, since the outer diameter of the rear end 33 is large, the contact length in the direction of the axis C can be shortened. As a result, the restriction at the time of attachment is reduced, and the degree of freedom in design can be increased.

Third Embodiment

Figure 7:
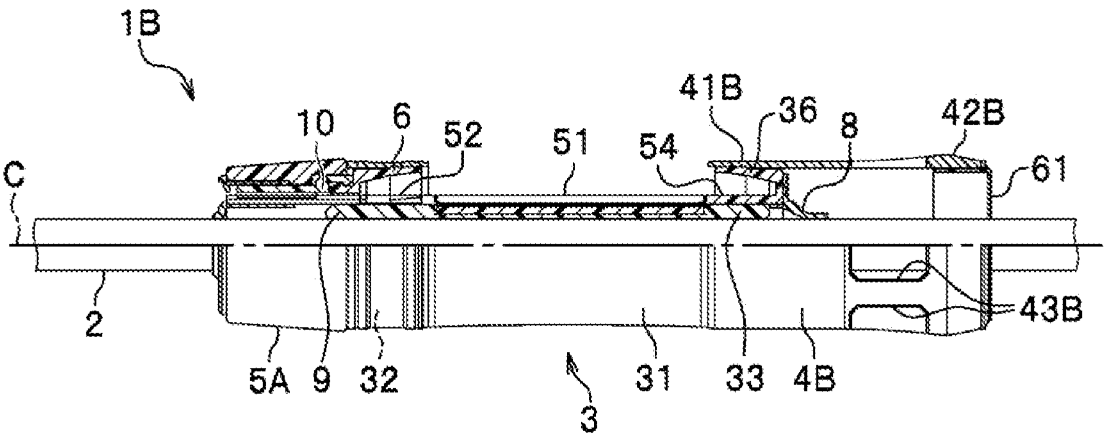
FIG. 7 is a side view illustrating a fishing rod according to a third embodiment of the present invention.

Next, a fishing rod according to a third embodiment of the present invention will be described. As illustrated in FIG. 7, the third embodiment is different from the second embodiment in the shape of a cylindrical body 4B. A fishing rod 1B according to the third embodiment will be described focusing on differences from the second embodiment.

As illustrated in FIG. 7, the cylindrical body 4B comprises a main body portion 41B, an extension portion 42B, and an opening 43B. The main body portion 41B has a cylindrical shape and is hollow. The extension portion 42B is a portion that is continuous to a rear end of the main body portion 41B and expands in diameter toward the rear side. The extension portion 42B itself is not in contact with a rod 2. The opening 43B is a hole that opens laterally in the extension portion 42B. At a rear end of the extension portion 42B, a lid member 61 that covers the rear end is provided. The lid member 61 may be omitted.

The fishing rod 1B described above can also achieve substantially the same effects as those of the first embodiment.

That is, the cylindrical body 4B may be attached to a rear end of a reel seat 3, or the diameter of the extension portion 42B may be increased rearward. This makes it possible to provide variations in a grip form.

Fourth Embodiment

Figure 8:
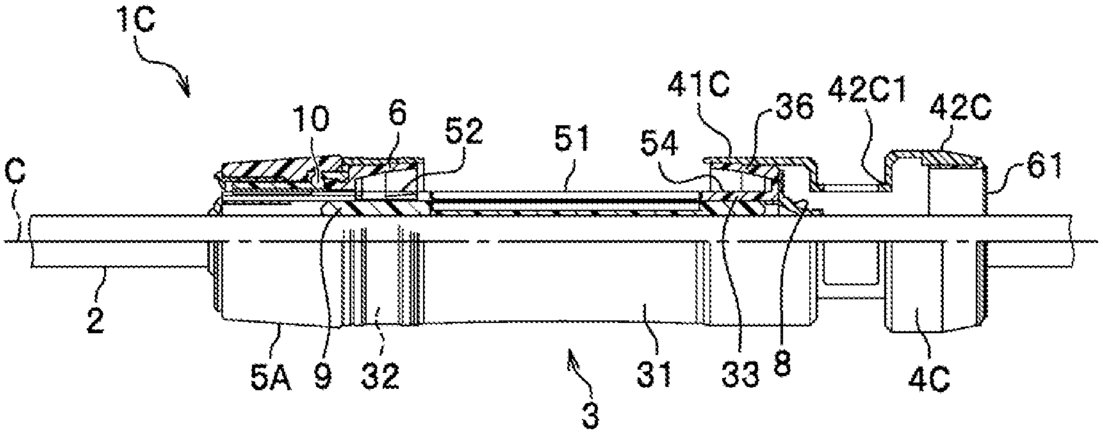
FIG. 8 is a side view illustrating a fishing rod according to a fourth embodiment of the present invention.

Next, a fishing rod according to a fourth embodiment of the present invention will be described. As illustrated in FIG. 8, in the fourth embodiment, a shape of a cylindrical body 4C is different from that of the second embodiment. A fishing rod 1C according to the fourth embodiment will be described focusing on differences from the second embodiment.

As illustrated in FIG. 8, the cylindrical body 4C comprises a main body portion 41C and an extension portion 42C.

The main body portion 41C has a cylindrical shape and is hollow. The extension portion 42C is continuous with a rear end of the main body portion 41C and has a cylindrical shape. A step portion 42C1 having a smaller diameter than other portions is formed at a center of the extension portion 42C. The extension portion 42C is not in contact with a rod 2. At a rear end of the extension portion 42C, a lid member 61 that covers the rear end is provided. The lid member 61 may be omitted.

The fishing rod 1C described above can also achieve substantially the same effects as those of the first embodiment.

That is, the cylindrical body 4C may be attached to a rear end of a reel seat 3, or may have a composite shape having a step like the extension portion 42C. This makes it possible to provide variations in a grip form.

Although the embodiments of the present invention have been described above, the design can be appropriately changed within a range not contradicting the gist of the invention. For example, in the present embodiments, the cylindrical body 4 is attached to the outside of the fixed hood 36, but the present invention is not limited thereto. For example, in a case where the front end of the reel seat is formed to be long, the reel seat may be attached to the front side of the fixed hood. Furthermore, in the present embodiments, the cylindrical body 4 is attached to the outside of the fixed hood 36, but the cylindrical body may be attached to the outside of the floating hood. Furthermore, in the cylindrical body 4 of the first embodiment, the diameter of the extension portion 42 is reduced. However, the outer diameter may be constant, the diameter may be increased forward, or the cylindrical body 4 may have a composite shape so as to be uneven.

REFERENCE SIGNS LIST

1 Fishing rod
2 Rod
3 Reel seat
6 Floating hood (hood)
31 Central portion
32 Front end (end)
33 Rear end (end)
4 Cylindrical body (grip)
36 Fixed hood (hood)
37 Step surface
41 Main body portion
42 Extension portion
43 Opening

What is claimed is:

1. A fishing rod comprising:
a rod;
a fixed hood and a floating hood into which reel legs of a reel are inserted;
a reel seat through which the rod is inserted; and
a cylindrical body that is attached to an end of the reel seat and serves as a grip, wherein:
the cylindrical body is attached to an outer peripheral surface of the end of the reel seat,
the cylindrical body comprises:
a main body portion attached to the outer peripheral surface of the end of the reel seat; and
a hollow extension portion being integrally formed with the main body portion and reducing in diameter in a direction away from the reel seat, the entire hollow extension portion being separated from the rod, and
the main body portion is adhesively bonded to an outer periphery of the fixed hood.

2. The fishing rod according to claim 1, wherein the cylindrical body is formed of metal.

3. The fishing rod according to claim 1,
wherein the reel seat comprises a central portion and the end at an edge of the central portion,
the end of the reel seat is smaller in diameter than the central portion to form a step surface, and
an outer peripheral surface of the main body portion of the cylindrical body and an outer peripheral surface of the central portion of the reel seat are flush with each other by attaching the cylindrical body to the step surface.

4. The fishing rod according to claim 1, wherein an opening opened to a side is formed in the hollow extension portion.

* * * * *